Figure 2:
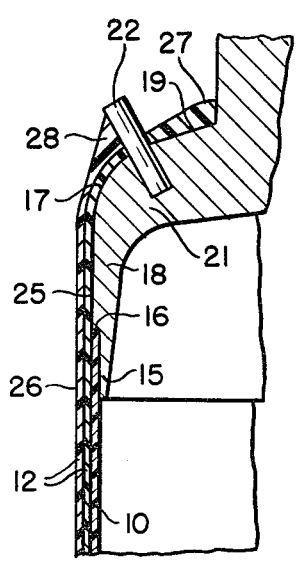

United States Patent [19]

Wurtinger et al.

[11] 4,411,114
[45] Oct. 25, 1983

[54] COMPRESSION-TENSION STRUT

[75] Inventors: Horst Wurtinger, Fürstenfeldbruck; Jochen Glissmann, Dachau; Herbert Heissler, Munich, all of Fed. Rep. of Germany

[73] Assignee: M.A.N. Maschinenfabrik Augsburg-Nurnberg Aktiengesellschaft, Munich, Fed. Rep. of Germany

[21] Appl. No.: 221,335

[22] Filed: Dec. 29, 1980

[51] Int. Cl.³ .............................................. E04L 3/30
[52] U.S. Cl. ............................ 52/309.1; 52/223 R; 52/230; 52/309.16; 52/727; 403/267
[58] Field of Search .............. 52/223, 224, 301, 309.1, 52/309.16, 720, 727, 230; 403/265, 266, 267

[56] References Cited

U.S. PATENT DOCUMENTS

| 2,593,714 | 4/1952 | Robinson | 52/727 |
| 2,677,956 | 5/1954 | Schorer | 52/230 |
| 2,921,463 | 1/1960 | Goldfein | 52/223 R |
| 3,332,244 | 7/1967 | McLean | 52/230 |
| 3,813,098 | 5/1974 | Fischer et al. | 52/727 |
| 4,312,162 | 1/1982 | Medney | 52/223 R |

FOREIGN PATENT DOCUMENTS

| 235539 | 7/1959 | Australia | 52/309.16 |
| 276717 | 12/1969 | Austria | 52/224 |
| 1188793 | 3/1965 | Fed. Rep. of Germany . | |
| 2146783 | 8/1973 | Fed. Rep. of Germany . | |
| 2408935 | 2/1974 | Fed. Rep. of Germany | 52/727 |

Primary Examiner—Alfred C. Perham
Attorney, Agent, or Firm—Craig & Burns

[57] ABSTRACT

Strut of a tubular wrapping of reinforcing fibers in a synthetic resin on a core, with two rounded tension end caps, the wrapping terminating on the rounded portions thereof, and with respectively one compression cap on an outer peg of each tension end cap and around the rounded section of the wrapping, in which strut the wrapping has longitudinal fibers extended over the rounded portions about pins affixed thereat and oriented obliquely toward the outside, and the core is a fiber-reinforced synthetic-resin pipe respectively attached on an inner peg of the tension peg for the concomitant absorption of the longitudinal compression or the longitudinal compression and longitudinal tension.

10 Claims, 2 Drawing Figures

COMPRESSION-TENSION STRUT

The invention relates to a strut.

In the longitudinal tension/longitudinal compression building component of this type known from German Pat. No. 2,146,783, the wrapping angle used for the wrapping step over the cylindrical portion of the wrapping must be relatively large, because a wrapping is extended over the rounded portion or a geodetic polar-cap surface; and besides, an outer peg is present. Thus, the strength of the fibers is exploited to a relatively small extent during longitudinal tensile stress and longitudinal compressive stress on the longitudinal tension/longitudinal compression building component, and furthermore the rigidity of the wrapping is not at an optimum. The core is a solid core and consists of a foam material for obtaining a maximally lightweight longitudinal tension/longitudinal compression building component of the above-mentioned type. The core does not participate in force absorption when the longitudinal tension/longitudinal compression building component is placed under longitudinal tensile stress and longitudinal compressive stress.

Furthermore, German Auslegesschift No. 1,188,793 discloses an internal-pressure-resistant pipe with end flanges and made of a wrapping disposed on a synthetic-resin core pipe which is not fiber-reinforced. This wrapping consists of peripheral fibers to absorb the internal pressure and of longitudinal fibers extended around pins at the end flanges. The pipe is stressed merely by the internal pressure, but not by longitudinal tension and not by longitudinal compression. This component is not a strut, much less a longitudinal tension-longitudinal compression strut. Tensile stress is exerted on the longitudinal fibers only in case of increased internal pressure. The longitudinal thread with its very small wrapping angle has its direction changed by a pin of the crown to a pin of such crown which is removed by several pins, the thread then leading around this pin to the other end flange zone. In case of these radial pins and the provided thread supports in the deflection zone, the deflection of the thread is rather abrupt, in spite of expensive mitigating means (inter alia two crowns of pins per pipe end with pins located at mutual spacings), so that the permissible tensile stress on the fibers is relatively small. In this arrangement, this is sufficient, because the internal pressure is absorbed to the largest part by the peripheral fibers.

It is an object of the invention to further develop the strut of the type mentioned hereinabove in such a way that greater longitudinal tensions are permissible in the composite fiber material, and the strut is able to absorb greater longitudinal tension and longitudinal compression.

The longitudinal tension is here absorbed by the wrapping or by the latter and the core pipe; the longitudinal compressive stress is absorbed by the core pipe and the wrapping. In contrast to the conventional longitudinal tension/longitudinal compression building component and the conventional flanged pipe, the core or a core pipe is likewise utilized in the present strut for force absorption in case of longitudinal stress on the strut, wherein the core pipe is fiber-reinforced, i.e. its force absorption capacity is relatively high. In spite of the rounded portion and the outer peg, larger tensile stresses are permissible in the composite fiber material and/or in the wrapping, because longitudinal fibers are employed. These are deflected by pins through the latter at the outer peg. The pins are oriented obliquely toward the outside, whereby the angle of deflection at the pin and thus the shear stress on the longitudinal thread ambient at that location are relatively small, smaller than in case of radial or axial pins. The oblique pins are provided on the rounded portion. The greater the rounded curvature and/or its radius or the like in the pin zone, the higher can be the stress on the longitudinal fiber in the longitudinal direction. The tensile strength of the longitudinal fibers thus can be exploited to a very high degree. A shape-mating connection in the longitudinal direction is provided between the rounded section of the wrapping and the rounded curvature, because the fibers are hung up, during longitudinal tension, on the oblique pins and the rounded portion. The rounded portion and the oblique pins provided thereon are well suitable for an advantageous deflection of the longitudinal threads during wrapping to make manufacture of the wrapped form easy. The longitudinal threads cannot slide off the pins during this step. This also holds true when the strut is placed under longitudinal tensile stress. In either case, the oblique pins absorb the forces acting laterally on the longitudinal threads. The wrapping thus can absorb a relatively high longitudinal tension. Due to the core pipe, this tension can even be higher. Also, relatively large compressive stresses are permissible in the composite fiber material and/or in the wrapping, due to the longitudinal fibers. Therefore, the wrapping can absorb even relatively high longitudinal compressive stress. This latter stress, too, can even be higher, due to the core pipe. Furthermore, the rigidity of the strut or of the wrapping is higher than in case of the conventional longitudinal tension/longitudinal compression building component. Thus, on account of the invention, a hollow, lightweight longitudinal tension-longitudinal compression strut has been provided satisfying very high requirements, and yet the invention requires relatively little expenditure.

Advantageous arrangements and further developments of the invention are disclosed. An angle range or angle for the oblique pin which is particularly advantageous in view of the solution of the problem involved is 15°–45°, preferably 30°. As for the arrangement of the oblique pins, they are arranged on the rounded portion in the form of a single crown. The single crown of oblique pins provided per each end is adequate and simple. An even higher permissible longitudinal tension is brought about in that the oblique pins are supported with respect to the longitudinal tension of the longitudinal fibers by peripheral fibers wrapped around the longitudinal fibers on the rounded portion axially on the inside beside the pins. The oblique pins and the pin-supporting peripheral fibers extend radially in general almost up to the outer diameter of the cylindrical part of the wrapping. A simple axial mounting of the core pipe in case of longitudinal compressive stress is provided in that the shoulder located at the beginning of the inner peg is the axial abutment for the core pipe. By the step of cementing (adhesive connection) the core pipe to the inner peg, the core pipe absorbs a portion of the longitudinal tensile stress. If the cementing should fail perhaps, the longitudinal tensile stress is only absorbed by the wrapping. The sealing compound (casting compound) can transmit longitudinal compressive stress in that the space between the rounded portion of the wrapping and the pins, on the one hand, and the compression cap, on the other hand, is filled with a hardened sealing compound. This compound is a curable composition, especially a synthetic resin, e.g. epoxy resin, or a synthetic resin system consisting of a synthetic resin and a curing agent and optionally a curing accelerator. This also holds true in general for the synthetic resin of the wrapping and of the core pipe. Longitudinal fibers in the synthetic resin of the core pipe likewise contribute toward increasing the permissible longitudinal compression and tension for the strut. The wrapping exhibits peripheral fibers from the oblique pins of one tension cap to those of the other tension cap. These peripheral fibers are wrapped around the longitudinal fibers. The core pipe can have peripheral fibers wrapped around the longitudinal fibers of the core pipe. These wrappings serve, in particular, as a protection against the escape of longitudinal fibers in case of longitudinal compressive stress. In general, the pin-supporting peripheral fibers constitute an end of the wrapping which becomes thicker in the radially inward direction.

The reinforcing fibers of the strut according to this invention are carbon fibers, in particular. The aforementioned longitudinal fibers are provided in the form of a layer of longitudinal fibers or as several layers of longitudinal fibers in direct radial succession. The above-mentioned peripheral fibers are provided in the same way. Also alternating arrangements are advantageous.

The thickness of the wrapping is generally larger than the thickness of the core pipe, for example about twice as large.

The strut of this invention can be utilized in the form of a lightweight rod or a lighweight rod element, for example, for framework scaffoldings—for example platforms in space—control linkages in aircraft and automobile construction, or a structure in satellite and rocket construction.

Figure 1:
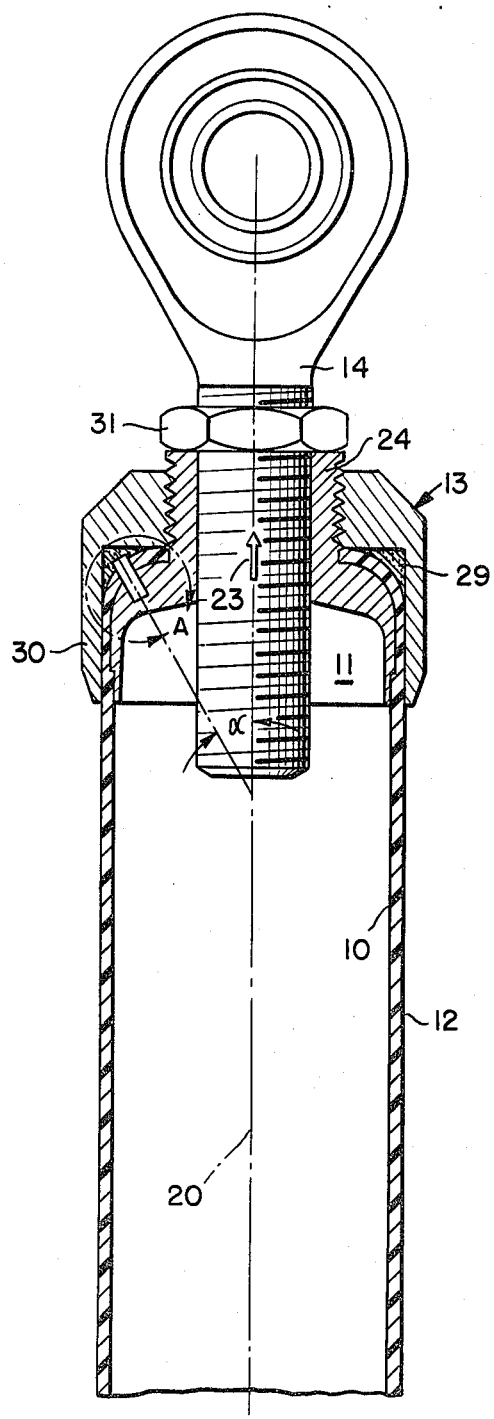

Referring now to the drawing wherein like reference numerals are used throughout the various views to designate like parts, FIG. 1 shows one embodiment of the strut of this invention, namely as seen toward one end, and shows this end proper in a longitudinal section.

FIG. 2 shows a detail A of this end on an enlarged scale.

The strut consists of a cylindrical core pipe 10, respectively one tension cap 11 having a circular cross section and provided on each end, a wrapping 12 (outer pipe) having the shape of a cylindrical tube, and respectively one compression cap 13 of a circular cross section and respectively one link rod head 14 on each end. The core pipe 10 and the wrapping 12 consist of fiber-reinforced synthetic resin. The wrapping has an outer diameter of about 50 mm. Its length is, for example, 220 mm, 400 mm, or 1000 mm.

The core pipe 10 is produced (wound) on a winding mandrel, not shown, and consists of a layer of longitudinal fibers (UD [unidirectional] fabric for absorption of tensile and compressive stresses) and a lap of peripheral fibers surrounding this layer. The wall thickness of the core pipe 10 is 0.5 mm. Each tension cap 11 exhibits an inner peg 15 which is outwardly cylindrical, the outer radius of this peg being smaller by the wall thickness of the core pipe 10 than the radius of the cylindrical outer circumference of the tension cap 11 between the shoulder 16 and the beginning of the rounded portion 17 of the tension cap 11. The core pipe 10 on each end extends on the inner peg 18 up to the shoulder 16 and is cemented to the inner peg 15.

The rounded portion 17 is of a circular shape in the illustrated longitudinal section, and its radius is about 1/6 of the outer diameter of the outwardly cylindrical part 18 of the tension cap 11, i.e. about 8 mm. The rounded portion 17 passes over into a steeply conical surface 19 forming an obtuse angle with the longitudinal direction 23 pointing axially toward the outside at the illustrated strut end (on the axis 20 of the core pipe 10). Straight, metallic pins 22 are arranged fixedly in the rounded zone 21 of the tension cap 11, these pins being grouped in the form of a single crown per end and being oriented obliquely toward the outside, i.e. the angle $\alpha$ between the pin 22 and the aforementioned longitudinal direction 23 at the illustrated strut end is about 30°. The pins 22 are provided on the rounded portion 17 in closer proximity to the radially inner end of the rounded portion 17 than to the radially outer end of the rounded portion 17. The tension cap 11 exhibits an outer peg 24.

The wrapping 12 is produced (wound) onto the unit consisting of the core pipe 10 and the tension caps 11 and consists of a layer 25 of longitudinal fibers (rovings) and a layer 26 of peripheral fibers surrounding the layer 25. The wrapping angle of the longitudinal fibers is very small or equal to zero (in parallel to the axis 20). The thickness of the cylindrical part of the wrapping 12 is 1.0 mm. The longitudinal threads of the wrapping 12 are wound continuously over the rounded portion 17 and about the pins 22, the longitudinal thread leading around a pin and then closely past the outer peg 24—see the longitudinal thread sections 27—to another pin 22, around the latter and back to the rounded portion 17 and the pins 22 of the other tension cap 11. The peripheral fibers 26 in the gusset 28 serve for supporting the pins 22. The compression cap 13 is threaded to the outer peg 24 up to a hardened sealing compound 29. A hollow-cylindrical part 30 of the compression cap 13 is cemented together with the end of the cylindrical portion of the wrapping 12.

The link rod head (or joint head) 14 is threaded through the tension cap 11 and clamped together with the outer peg 24 by means of a nut 31. The force-applying elements, i.e. the tension caps 11 and the compression caps 13, consist of a metal, especially a light metal, e.g. aluminum.

The tensile strength of the composite fiber material of the wrapping and of the core pipe is higher than the compressive strength of this material. In case of this embodiment, this strength is larger by 50%. The maximum tensile load is equal to the maximum compressive load, or the product of the tensile strength and the cross section of the wrapping 12 (assuming that the core pipe 10 is not under tensile load) is equal to the product of the compressive strength and the cross section of the wrapping 12 and of the core pipe 10

$$(P_{Tens.max} = P_{Compr.max} = \sigma_{Tens.} \cdot F_{12} = \sigma_{Compr.} \cdot F_{12+10}).$$

While we have shown and described one embodiment in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A strut for longitudinal tension and longitudinal compression comprising a tubular wrapping from reinforcing fibers in a synthetic resin on a core, with respectively one rounded cap provided at each end and exhibiting a central outer peg, the wrapping terminating on the rounded portion of this cap, the latter serving as a tension cap, and with respectively one compression cap attached to the outer peg and surrounding the rounded section of the wrapping, the wrapping of the strut exhibits longitudinal fibers extended over the two rounded portions around pins fixedly provided on the rounded portions and oriented obliquely toward the outside; and the core being a pipe of a fiber-reinforced synthetic resin and respectively affixed to an inner peg of the tension cap, for the concomitant absorption of the longitudinal compression or of the longitudinal compression and longitudinal tension.

2. A strut according to claim 1, wherein the angle ($\alpha$) between the oblique pin and the longitudinal direction of the strut is 45°-15°, especially about 30°.

3. A strut according to claim 1 or 2, wherein the oblique pins are arranged on the rounded portion in the form of a single crown.

4. A strut according to claim 1, wherein the oblique pins are supported with respect to the longitudinal tension of the longitudinal fibers by peripheral fibers wrapped around the longitudinal fibers on the rounded portion axially on the inside beside the pins.

5. The strut according to claims 1 or 4, wherein a shoulder located at the beginning of the inner peg is the axial abutment for the core pipe.

6. The strut according to claim 1, wherein the core pipe is cemented to the inner peg.

7. The strut according to claim 1, wherein the space between the rounded portion of the wrapping and the pins, on the one hand, and the compression cap, on the other hand, is filled with a hardened sealing compound.

8. The strut according to claim 1, wherein the core pipe has longitudinal fibers.

9. The strut according to claims 1 or 4, wherein the wrapping exhibits peripheral fibers from the oblique pins of one tension cap to those of the other tension cap, these peripheral fibers being wrapped around the longitudinal fibers.

10. The strut according to claim 8, the core pipe has peripheral fibers wrapped around the longitudinal fibers of this pipe.

* * * * *